United States Patent
Cook

(10) Patent No.: US 6,477,357 B1
(45) Date of Patent: Nov. 5, 2002

(54) CUSTOMIZABLE WIRELESS DEVICE HAVING STACKABLE MODULES

(75) Inventor: Charles I. Cook, Louisville, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/534,793

(22) Filed: Mar. 24, 2000

(51) Int. Cl.[7] .................................................. H04B 1/38
(52) U.S. Cl. ........................ 455/90; 455/128; 455/575; 455/349; 455/348; 455/369; 361/814
(58) Field of Search ............. 455/90, 128; 379/357.01, 379/356.01, 357.02, 357.05; 361/814

(56) References Cited

U.S. PATENT DOCUMENTS

| | | | | |
|---|---|---|---|---|
| 5,438,482 A | * | 8/1995 | Nakamura et al. | 174/35 R |
| 5,689,823 A | * | 11/1997 | Phillips | 455/186.1 |
| 5,722,055 A | * | 2/1998 | Kobayashi et al. | 455/128 |
| 5,832,371 A | * | 11/1998 | Thornton | 361/814 |
| 6,101,372 A | * | 8/2000 | Kubo | 439/354 |
| 6,377,825 B1 | * | 4/2002 | Kennedy et al. | 455/556 |
| 6,397,081 B1 | * | 5/2002 | Franck et al. | 455/347 |
| 6,405,029 B1 | * | 6/2002 | Nilsson | 379/88.03 |
| 6,408,068 B1 | * | 6/2002 | Larson et al. | 379/353 |

* cited by examiner

Primary Examiner—Thanh Cong Le
Assistant Examiner—Andrew T Harry
(74) Attorney, Agent, or Firm—Brooks & Kushman, P.C.

(57) ABSTRACT

A wireless device such as a wireless telephone includes stackable modules. Each of the modules provides an independent wireless device function. Each of the modules stacks onto and connects to at least one of the other modules. Each of the modules includes a communications contact connected to a communications contact of at least one of the other modules. Each of the modules also includes a power bus contact connected to a power bus contact of at least one of the other modules. The modules include a memory module, a flash memory module, a read only memory (ROM) module, a random access memory (RAM) module, a central processing unit (CPU) module, a display module, a keypad module, a transceiver module, a battery module, a global positioning satellite (GPS) receiver module, and the like. Each of the modules includes keying patterns to ensure that the modules are connected together in a proper order.

17 Claims, 1 Drawing Sheet

CUSTOMIZABLE WIRELESS DEVICE HAVING STACKABLE MODULES

TECHNICAL FIELD

The present invention relates generally to wireless devices and, more particularly, to a customizable wireless device having stackable modules.

BACKGROUND ART

Wireless devices such as wireless phones include various components for performing different functions. The components are combined together in a housing to enable the wireless device to function properly. For instance, typical wireless phones include a keypad, a display, a battery and other components which are combined within a housing to enable the phones to work properly. Typically, wireless devices are mass produced and each set of mass produced wireless devices includes the same components. The components are chosen by designers based on their function, performance, cost, durability, and the like.

For some users, the cost and features of mass produced wireless devices are satisfactory. However, a problem with this approach is that many users desire different or custom features of their wireless devices. For example, some users may desire a large memory, a large battery, and minimal software. Other users may desire a large memory, a small battery, and sophisticated software. Further, other users may desire a small memory, a large battery, and minimal software. As the number of wireless device features increase the number of user permutations increase accordingly. It is not feasible to produce wireless devices having all of the different combinations of features to satisfy the unique needs of all users. As a result, wireless devices are manufactured to satisfy the majority of the needs of the majority of the users. A problem with this approach is that mass produced wireless devices satisfy all of the needs of only a small minority of the users.

SUMMARY OF THE INVENTION

Accordingly, it is an object of the present invention to provide a customizable wireless device having stackable modules.

It is another object of the present invention to provide a customizable wireless device such as a wireless telephone having stackable modules which can be fastened together in a variety of configurations tailored to meet individual needs.

It is a further object of the present invention to provide a customizable wireless device such as a wireless telephone having stackable modules which modularize functions of the wireless device.

It is still another object of the present invention to provide a customizable wireless device such as a wireless telephone having stackable modules in which each module includes communications and power bus contacts.

In carrying out the above objects and other objects, the present invention provides a wireless device such as a wireless telephone having a plurality of stackable modules. Each of the modules provides an independent wireless device function. Each of the modules is connected to at least one of the other modules. Preferably, each of the modules includes a communications contact connected to a communications contact of at least one of the other modules. Each of the modules includes a power bus contact connected to a power bus contact of at least one of the other modules. The modules include a memory module, a flash memory module, a read only memory (ROM) module, a random access memory (RAM) module, a central processing unit (CPU) module, a display module, a keypad module, a transceiver module, a battery module, and a global positioning satellite (GPS) receiver module. Each of the modules includes keying patterns to ensure that the modules are stacked and connected together in a proper order.

Further, in carrying out the above objects and other objects, the present invention provides a method of making a wireless device. The method includes providing a plurality of stackable modules each providing independent wireless device functions. Keying patterns are then made on the modules. Each of the modules is then stacked onto at least one of the other modules using the keying patterns to ensure that the modules are stacked and connected together in a proper order.

The advantages associated with the customizable wireless device of the present invention are numerous. For instance, the stackable modules can be connected together to be tailored to meet the needs of individual users. This enables the wireless device to be flexible in meeting individual needs. For example, one user may customize the wireless device by incorporating large memory modules and a fast CPU module. Another user may customize the wireless device by incorporating a desired display module and a desired keypad module.

The above objects and other objects, features, and advantages of the present invention will be apparent from the following detailed description of the best mode for carrying in connection with the accompanying drawings.

BEST MODE FOR CARRYING OUT THE INVENTION

Figure 1:
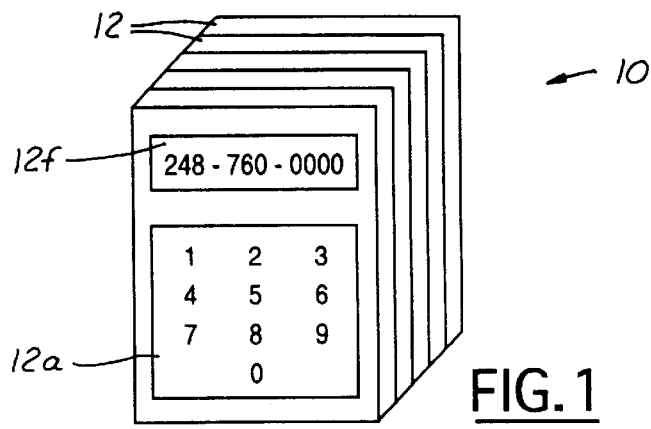
FIG. 1 illustrates a perspective view of a customizable wireless device in accordance with the present invention.
Figure 2:
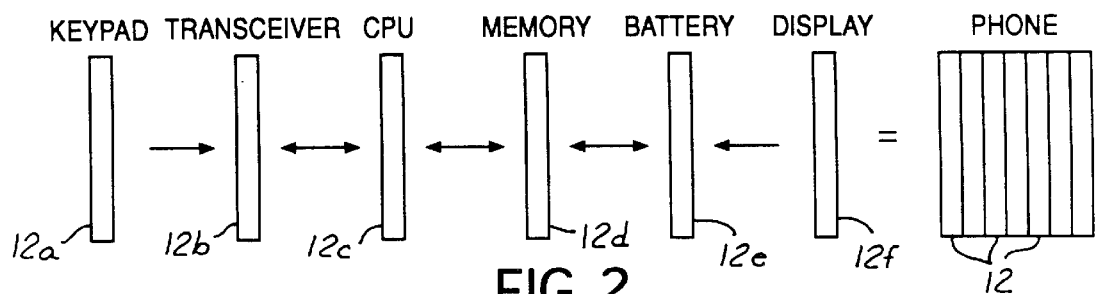
FIG. 2 illustrates a sectional view of the customizable wireless device shown in FIG. 1.

FIG. 1 illustrates a perspective view of a customizable wireless device such as a wireless telephone 10 in accordance with the present invention. FIG. 2 illustrates a sectional view of wireless telephone 10. Wireless telephone 10 includes a plurality of stackable modules 12 which are fastened together. Each of modules 12 provides an independent wireless telephone function. For example, wireless telephone 10 includes a keypad module 12a, a transceiver module 12b, a central processing unit (CPU) module 12c, a memory module 12d, a battery module 12e, and a display module 12f. Other modules may include a global positioning satellite (GPS) receiver module.

Keypad module 12a enables the user to enter commands into wireless telephone 10. Transceiver module 12b provides electrical circuitry for transmitting and receiving communications signals with other users. CPU module 12c processes communications signals and commands and enables Internet browsing. Memory module 12d provides storage for storing operating system software, telephone numbers, downloaded files, and the like. Memory module 12d may be a flash memory module, a read only memory (ROM) module, a random access memory (RAM) module, or the like. Battery module 12e supplies electrical power for wireless telephone 10. Display module 12f displays information regarding operation of wireless telephone 10. GPS receiver module is operable to indicate the location of wireless telephone 10.

Each module 12 stacks onto and connects to at least one other module. For example, keypad module 12a stacks onto and connects with transceiver module 12b. Transceiver module 12b is stacked between and connected to keypad module 12a and CPU module 12c. All of the modules 12 stack up against one another and then are connected to one another to make wireless telephone 10. Modules 12 attach securely for rigidity and to ensure connectivity between the modules.

Figure 3:
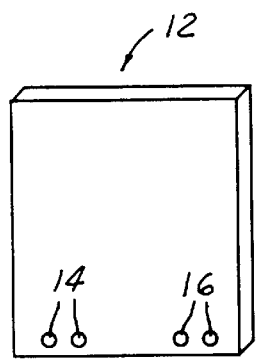
FIG. 3 illustrates a frontal view of a module of the customizable wireless device shown in FIG. 1.
Figure 4:
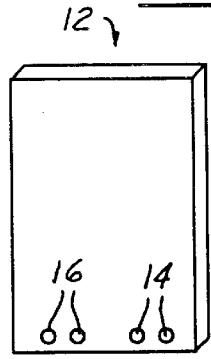
FIG. 4 illustrates a rear view of the module shown in FIG. 3.

FIG. 3 illustrates a frontal view of a module 12 showing communications bus contacts 14 and power bus contacts 16 of the module. FIG. 4 illustrates a rear view of module 12. Each module 12 has communications bus contacts 14 which contact with the communications contacts of adjacent modules to enable communication to pass between all of the modules. Similarly, each module 12 has power bus contacts 16 which contact with the power bus contacts of adjacent modules to enable electrical power supplied by battery module 12e to pass between all of the modules. The bus contacts 14 and 16 include any number of contacts to define an appropriately sized bus.

Figure 5:
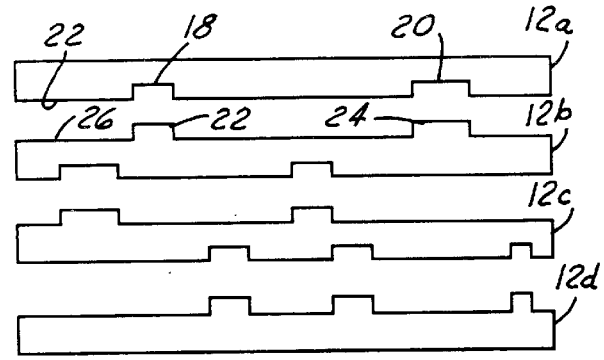
FIG. 5 illustrates a side view of the modules showing the keying pattern feature of the modules.

FIG. 5 illustrates a side view of modules 12. Each of modules 12 includes keying patterns to ensure that the modules are stacked together properly in a desired order. For instance, module 12a includes keying patterns 18 and 20 which are cut into the bottom face 22 of module 12a. Module 12b includes keying patterns 24 and 26 which extend from top face 28 of module 12b. Keying patterns 24 and 26 correspond and fit into keying patterns 18 and 20 to enable bottom face 22 of module 12a and top face 26 of module 12b to connect and meet flush with one another. Similarly, module 12b includes keying patterns 28 and 30 which are cut into the bottom face 32 of module 12b. Keying patterns 28 and 30 correspond with keying patterns of module 12c to connect modules 12b and 12c. Modules 12c and 12d also include keying patterns to ensure that they are properly connected together. A feature of the keying patterns is that they ensure that modules 12 are stacked in a proper order and that only compatible modules are stacked against each other.

Of course, some of the modules may have specific keying patterns to ensure that they are located at a specified location. For instance, display module 12f needs to be located at the outside of the wireless device to enable a user to view the display. The specific keying patterns also ensure that no other modules may be located at the specified location. Other modules may have general keying patterns or no patterns at all to enable them to have more freedom in their location in the wireless device. For example, CPU module 12c and memory module 12d may have the same general keying pattern enabling either of them to be located at a given location within the wireless device.

Figure 6:
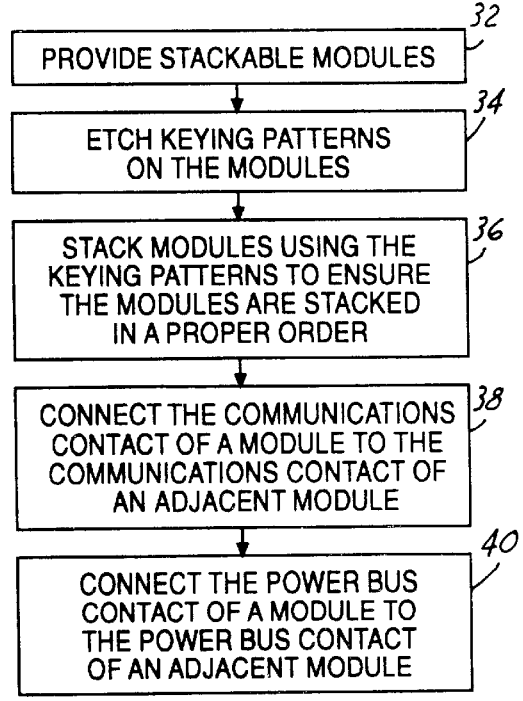
FIG. 6 illustrates a flow chart describing operation of the method for making the customizable wireless device shown in FIG. 1.

Referring now to FIG. 6, a flow chart 30 describing operation of the method for making the customizable wireless device is illustrated. Flow chart 30 begins with providing a plurality of stackable modules as shown in box 32. Each of the modules provide independent wireless device functions. Keying patterns are then made or etched on the modules as shown in box 34. Each of the modules is then stacked onto at least one of the other modules using the keying patterns to ensure that the modules are connected together in a proper order as shown in box 36. Stacking the modules includes connecting the communications contact of a respective module to the communications contact of at least one of the other modules as shown in box 38. Stacking the modules further includes connecting the power bus contact of a respective module to a power bus contact of at least one of the other modules as shown in box 40.

Thus, it is apparent that there has been provided, in accordance with the present invention, a customizable wireless device having stackable modules and an associated method that fully satisfy the objects, aims, and advantages set forth above. While the present invention has been described in conjunction with specific embodiments thereof, it is evident that many alternatives, modifications, and variations will be apparent to those skilled in the art in light of the foregoing description. The described modules are intended to be an example of the types of modules that may be used in accordance with the present invention. Other modules are envisioned for use with the present invention and are intended to be used for making customizable wireless devices. Accordingly, it is intended to embrace all such alternatives, modifications, and variations as fall within the spirit and broad scope of the appended claims.

What is claimed is:

1. A wireless device comprising:

a plurality of stackable modules each providing an independent wireless device function, wherein each module has the same generally rectangular cross-sectional shape, wherein the rectangular cross-sectional shape of each module includes a keying pattern, wherein the keying pattern of each module corresponds to the keying pattern of the other modules which are to be stacked adjacent to the module in a stack, wherein the modules are stacked upon one another in a proper stacking order defined by the keying patterns with each module being connected to adjacent modules in the stack.

2. The wireless device of claim 1 wherein:

each module includes a communications contact for communicating with the other modules, wherein the communications contact of each module is connected to the communications contact of the adjacent modules in the stack.

3. The wireless device of claim 1 wherein:

each module includes a power bus contact for transferring power with the other modules, wherein the power bus contact of each module is connected to the power bus contact of the adjacent modules in the stack.

4. The wireless device of claim 1 wherein:

the modules include a memory module.

5. The wireless device of claim 4 wherein:

the memory module is a flash memory module.

6. The wireless device of claim 1 wherein:

the modules include a read only memory (ROM) module.

7. The wireless device of claim 1 wherein:

the modules include a random access memory (RAM) module.

8. The wireless device of claim 1 wherein:

the modules include a central processing unit (CPU) module.

9. The wireless device of claim 1 wherein:

the modules include a display module.

10. The wireless device of claim 1 wherein:

the modules include a keypad module.

11. The wireless device of claim 1 wherein:

the modules include a transceiver module.

12. The wireless device of claim 1 wherein:

the modules include a battery module.

13. The wireless device of claim 1 wherein:

the modules includes a global positioning satellite (GPS) receiver module.

14. The device of claim 1 wherein:

the wireless device is a wireless telephone.

15. A method of making a wireless device, the method comprising:

providing a plurality of stackable modules each providing an independent wireless device function and each having the same generally rectangular cross-sectional shape;

forming a keying pattern on the rectangular cross-sectional shape of each module such that the keying pattern of each module corresponds to the keying pattern of the other modules which are to be stacked adjacent to the module in a stack; and stacking the modules upon one another in a proper stacking order defined by the keying patterns with each module being connected to adjacent modules in the stack.

16. The method of claim 15 wherein:

each module includes a communications contact for communicating with the other modules, wherein stacking the modules upon one another includes connecting the communications contact of each module to the communications contact of the adjacent modules.

17. The method of claim 15 wherein:

each module includes a power bus contact for transferring power with the other modules, wherein stacking the modules upon one another includes connecting the power bus contact of each module to the power bus contact of the adjacent modules.

* * * * *